May 21, 1968  F. M. FULTON  3,384,201

TREE CROP HARVESTING APPARATUS

Filed Aug. 1, 1966  2 Sheets-Sheet 1

INVENTOR.
FRANCIS M. FULTON
BY
Elliott & Pastoriza
ATTORNEYS

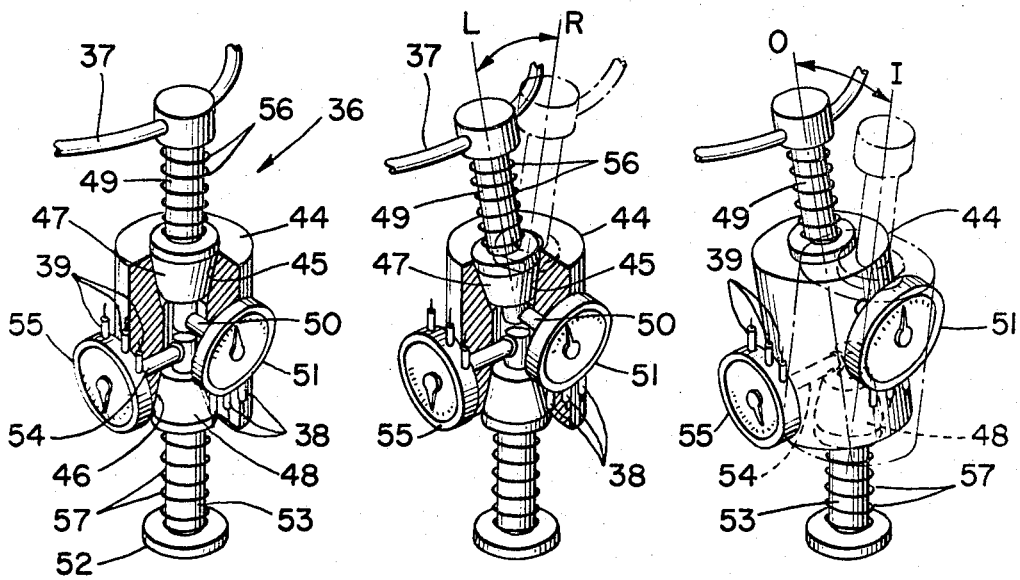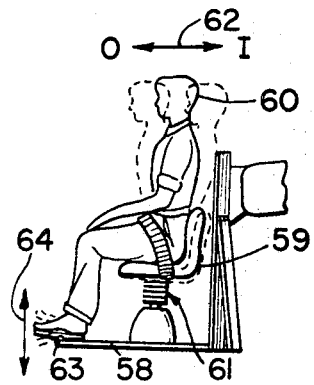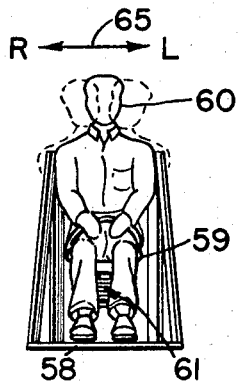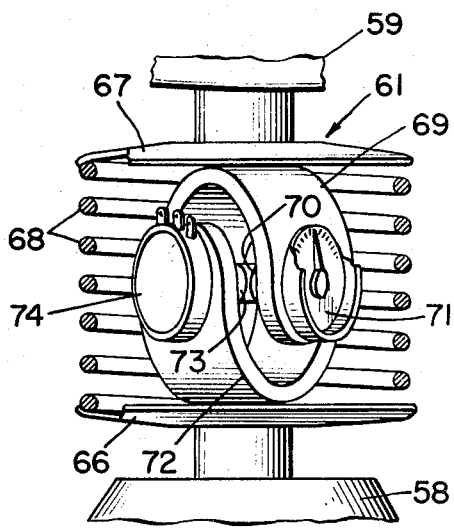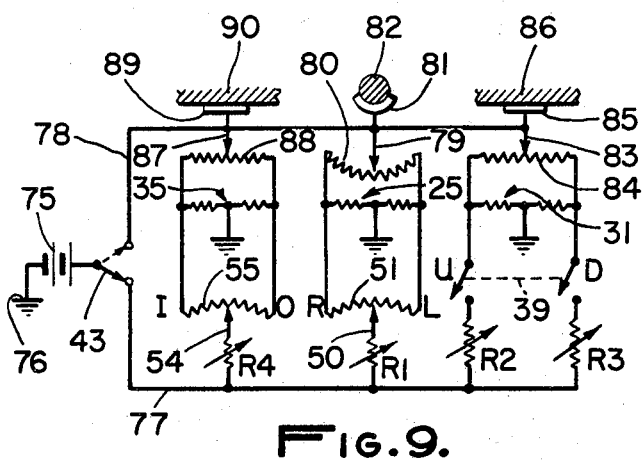

United States Patent Office 3,384,201
Patented May 21, 1968

3,384,201
TREE CROP HARVESTING APPARATUS
Francis M. Fulton, P.O. Box 632,
Santa Paula, Calif. 93060
Filed Aug. 1, 1966, Ser. No. 569,280
5 Claims. (Cl. 182—148)

ABSTRACT OF THE DISCLOSURE

A tree crop harvesting apparatus is provided for positioning a harvester in three dimensions for conveniently harvesting trees. The apparatus includes a vertical boom rotatable about a vertical axis, a carriage structure adapted to move up and down on the boom and a supporting platform adapted to move in and out from the carriage structure. The supporting platform includes hydraulic control means having a control portion engaging about the chest or torso of the person on the platform such that when the person leans in a left or right direction, a proper control will be energized to rotate the boom and swing the platform in a left or right direction and when the person leans in a forward or rear direction another drive control is actuated to move the platform in and out from the carriage. There is also provided a leg operable means for effecting up and down movement of the carriage. The person's arms are at all times free and the platform will automatically follow the bodily movements of the person.

---

This invention relates broadly to power apparatus for moving a person in various directions and more particularly to an improved power apparatus for facilitating tree crop harvesting operations.

In its broadest aspects, the present invention may be useful in any situation in which it is desired to position a worker or other person in various spatial locations to enable him to carry out certain operations. Such operations may include working on telephone lines, exterior building construction operations, and other situations wherein three dimensional positioning of the worker is necessary. For purposes of the present specification, the preferred embodiment of the invention will be described as utilized in a tree crop harvesting apparatus.

Many structures, both mobile and stationary have been proposed heretofore to elevate and position a crop picker adjacent to various tree branches to facilitate harvesting of the tree crop. Generally such machines as have been provided are capable of moving the harvester in three dimensions; to wit: left and right, up and down, and in and out. Basically, the presently known machines operate on the principle of a boom structure anchored on a truck bed. The desired movements are effected by swinging the boom in side to side and up and down directions and also telescoping the boom to increase or shorten its length. Compounding of these movements will enable positioning of a harvester supported at the end of the boom in any desired spatial location within the structural limits of the apparatus.

Such arrangements as described above necessitate fairly complicated equipment. The primary problem resides in the provision of a boom assembly which is sufficiently strong to cantilever the person at a maximum distance from the base in accordance with the dimensions of the particular tree involved. The strains involved at the base mounting of the boom necessitate sophisticated engineering which results in an expensive and relatively complicated structure.

Considering further presently available machines, the structural platform supporting a harvester generally incorporates controls for enabling the harvester himself to position the platform at various locations. However, these controls must be manually operated and thus the harvester's hands are not free for picking fruit until he has positioned the carrying platform at a desired location.

With the two basic foregoing considerations in mind, it is a primary object of the present invention to provide a greatly improved tree crop harvesting apparatus in which the foregoing problems are overcome.

More particularly, it is an object to provide an improved tree crop harvesting apparatus in which a harvester may be spatially positioned in three dimensions without the necessity of complicated equipment and without the necessity of subjecting any one portion of the supporting structure to undue strains all to the end that a considerably more economical mobile type tree harvesting apparatus results.

Another particular object of this invention is to provide a tree crop harvesting apparatus in which the person or harvester himself many control his position without having to use his hands all to the end that tree crops may be harvested during motion of the apparatus as well as when the apparatus is stationary with the beneficial result of a greater yield per man hour.

Briefly, these and other objects and advantages of this invention are attained by providing a basic supporting structure adapted to be positioned adjacent to trees to be harvested. A vertical boom is mounted on the structure for rotation about a vertical axis. A carriage in turn is mounted on the boom for up and down traveling movement. This carriage supports a platform frame capable of in and out movement relative to the carriage. The platform frame itself is designed to carry a harvester or other person.

Suitable first, second, and third drive means are connected respectively to rotate the vertical boom, move the carriage in an up and down direction, and move the platform frame in an in and out direction. The operation of the drive means is controlled by first, second, and third control means located in the platform frame for enabling selective, independent operation by a harvester or other person carried in the platform frame.

With the foregoing arrangement, there is provided a very simple and reliable engineering structure wherein the platform frame and thus the person carried thereby may be spatially positioned in any three dimensional location quickly and without undue strain on the various parts. In this respect, the vertical boom structure always remains in a vertical position and is only rotated to effect left and right movement. The carriage on the vertical boom provides up and down movement and the platform frame moves in a horizontal direction in and out from the carriage. It will be evident that these movements may be carried on simultaneously.

The control means in the platform includes novel swivel means arranged to be engaged by selected portions of the harvester's body leaving his hands free for picking fruit or performing other operations. The design is such that when the harvester leans in a given direction, the controls are actuated to cause the platform frame to move in such direction and when the harvester straightens to a normal position, the platform frame will stop. Thus, left and right and in and out movements are effected by the harvester leaning to the left or right or leaning rearwardly or forwardly. Up and down movements in turn are controlled by a structure arranged to be actuated by a portion of the harvester's leg so that when he raises his leg, the platform frame will rise and when he lowers his leg or effects another body engaging operation in a downward direction, the platform frame will be lowered.

The invention further contemplates suitable modifications whereby the structure may be actuated by the harvester when in a sitting position.

A better understanding of the invention will be had by now referring to a detailed description thereof in conjunction with the accompanying drawings, in which.

FIGURES 3, 4, and 5 are diagrammatic perspective fragmentary views of swivel means constituting part of an overall control means disposed in the platform frame for operation by the harvester;

FIGURES 6, 7, and 8 show an alternative structure for operation by a harvester in a seated position; and FIGURE 9 is a simple schematic electrical circuit diagram useful in explaining the manner in which the drive means for positioning the platform frame operate.

Figure 1:
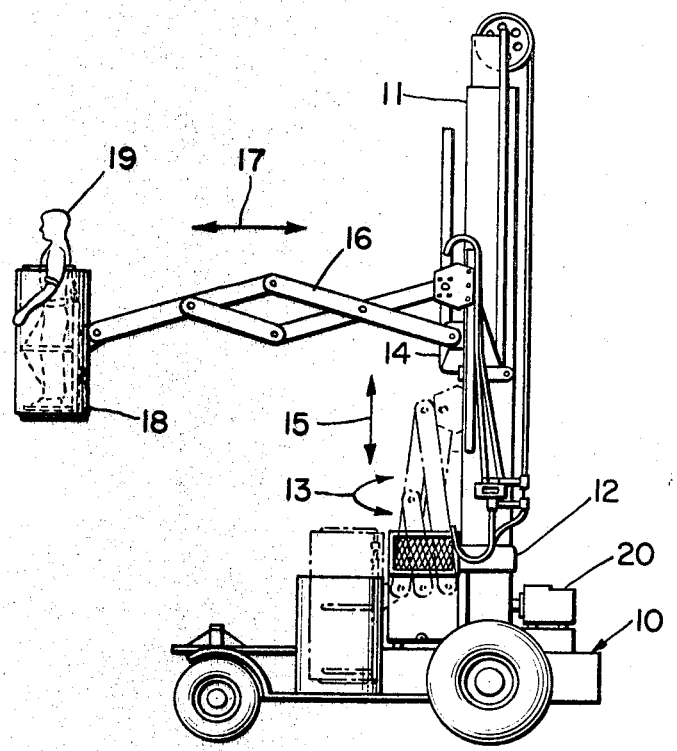
FIGURE 1 is a side elevational view of the tree crop harvesting apparatus with the platform frame for carrying a harvester in an extended condition.

Referring first to FIGURE 1 there is shown the tree crop harvesting apparatus as comprising a basic supporting frame 10 which may constitute a truck bed. A boom structure 11 in turn is rotatably mounted to the truck bed as by a suitable bearing structure 12. With this arrangement, the boom 11 may be rotated about its own vertical axis as indicated by the double headed arrow 13.

The boom structure supports a carriage 14 through any suitable mechanism such that the carriage 14 may be caused to move up and down the boom 11 as indicated by the double headed arrow 15. In this operation, the boom itself may be of a telescoping type structure so that the vertical extent of travel of the carriage 14 may be increased.

As shown in FIGURE 1, the carriage 14 supports a lazy tong assembly 16 capable of moving in and out in a horizontal plane relative to the carriage 14 as indicated by the double headed arrow 17. The end of the lazy tong structure terminates in a platform frame 18 designed to carry a person such as a harvester 19.

In the particular embodiment chosen for illustrative purposes, the various rotary, up and down, and in and out motions are effected by an hydraulic drive means. Towards this end, there is provided a source of pressurized hydraulic fluid indicated schematically by the numeral 20 carried on the truck bed or supporting structure 10.

Figure 2:
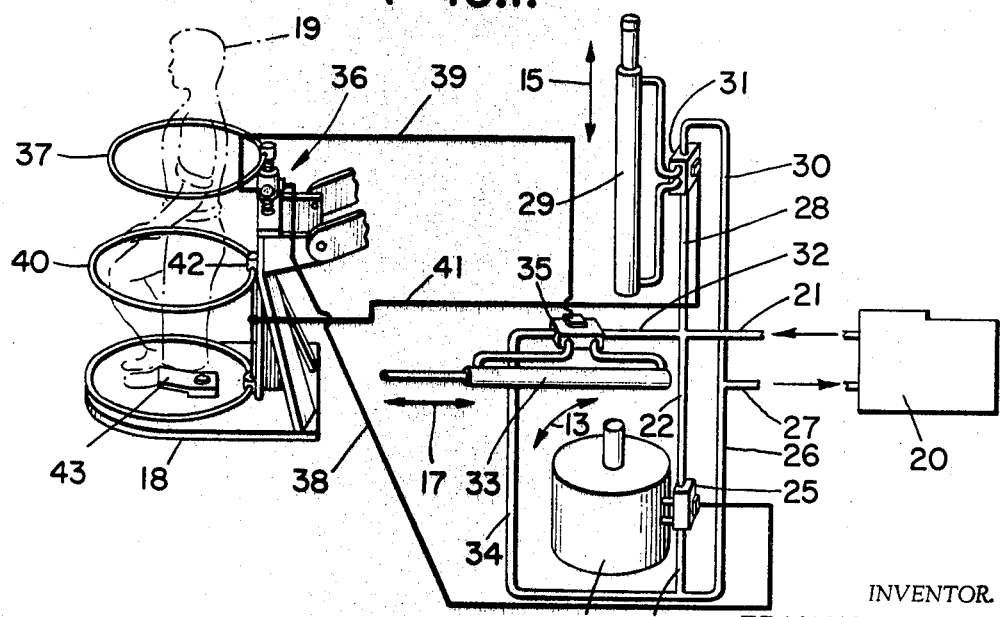
FIGURE 2 is a schematic perspective view useful in explaining the various drive means for positioning the platform frame.

Referring now to FIGURE 2, the manner in which the various motions described with respect to FIGURE 1 are carried out by hydraulic means will be understood. Essentially, the source of hydraulic fluid 20 has an outlet connected to a hydraulic line 21 which passes hydraulic fluid through a downwardly extending branch line 22 to a rotary hydraulic drive 23 for effecting rotational movement of the boom 11 about its vertical axis. Hydraulic fluid from the rotary drive 23 passes through an outlet line 24. A suitable electrically controlled hydraulic servo-valve 25 is disposed between the inlet line 22 and outlet line 24 for passing fluid to the rotary drive 23 as required. Fluid in the line 24 passes up through a branch line 26 to a return line 27 connected to the source of fluid 20.

Pressurized hydraulic fluid received in the line 21 also passes up through a branch line 28 to be received in an hydraulic cylinder 29 for controlling up and down movement of the carriage. Hydraulic fluid from the hydraulic cylinder structure 29 is passed through a return line 30 to the inlet line 27 and hydraulic source 20. A second electrically controlled hydraulic servo-valve 31 is disposed between the lines 28 and 30 for controlling the flow of hydraulic fluid to the cylinder 29.

Finally, pressurized hydraulic fluid in the inlet 21 passes through the line 32 to a third hydraulic drive control cylinder 33 for effecting in and out movement of the platform frame 18. Return hydraulic fluid from the hydraulic cylinder 33 passes through return line 34 to line 26 and return line 27 connected to the source 20. A third electrically controlled hydraulic servo-valve 35 is disposed between the lines 32 and 34 to control flow of hydraulic fluid to the cylinder 33.

The hydraulic units 23, 29, and 33 constitute first, second and third drive means for controlling the rotary, up and down, and in and out movements of the platform frame 18. When the platform frame 18 is extended as in FIGURE 1, the rotary movement effected by the unit 23 essentially swings the platform frame 18 in left and right directions. This motion may be linearized by simultaneously causing a slight extension of the in and out lazy tong structure 16 so that the movement of the platform 18 is not necessarily limited to an arc.

Actuation of the first, second, and third drive means described in FIGURE 2 is achieved by first, second, and third control means disposed in the platform frame 18. This control means includes a swivel structure 36 cooperating with a body engaging ring 37. The ring 37 is designed to encircle a person's chest such as that of the harvester 19 illustrated in dotted lines in FIGURE 2. The arrangement is such that when the swivel means 36 is caused to move to the left or right, which movement in FIGURE 2 is deemed to be out of the plane of the drawing and into the plane of the drawing, suitable signals are passed through leads designated schematically at 38 to the electrically operated hydraulic valve 25. This valve will then cause hydraulic fluid from the inlet line 22 to pass to the rotary hydraulic drive 23 and effect rotational movement of the boom 11 such as to swing the platform frame 18 to the left or right as described in conjunction with the double headed arrow 13.

Similarly, the swivel structure is designed such that inward and outward movement of the platform frame 18 may be effected by the harvester 19 engaging the ring 37 to move the same rearwardly or forwardly. Thus, rearward or forward movement of the harvester 19 to engage the ring 37 will move the swivel structure 36 to provide suitable signals on leads 39 to the in and out electrically controlled valve 35.

In FIGURE 2 there is disclosed a second body engaging ring 40 which is disposed below the ring 37 and is arranged to be engaged by a portion of the harvester's leg. The arrangement is such that upper movement of the ring 40 will transmit signals through a lead 41 from a switch 42 connected to the ring 40 to the up and down hydraulic drive cylinder electrical control 31. This servo-valve will be moved in a proper direction to raise the platform 18 by moving the carriage upwardly. Downward movement of the ring 40 will in turn actuate the electrical control valve 31 through the leads 41 to move the carriage downwardly.

From the description thus far, it will clearly be evident that the harvester 19 need only lean in the direction in which he desires to be moved by the platform frame 18. By employing circular type rings, the harvester 19 may lean in angulated directions; that is, directions intermediate left or right or forward or rearward. Such action will operate the swivel control 36 such as to simultaneously operate the corresponding electrically controlled valves for the corresponding drive cylinders so that the compound motion will result in movement of the platform frame 18 in the actual direction of leaning by the harvester 19. Accordingly, the harvester's hands will at all times be free to pick fruit or otherwise work on trees or other structures.

Also provided on the platform frame is a "dead man" safety switch 43. This switch is preferably operated by the operator's heel and is normally biased to a position such as to disconnect the leads 38, 39, and 41 from their corresponding control units on the platform 18 such that the platform 18 will remain in any position to which it has been moved. To again place control under the harvester 19, it is necessary that he place his heel on the switch 43 and hold the same in a position wherein the leads 38, 39, and 41 are properly connected to the control means on the platform. This feature is important in that it will avoid accidents should the harvester or other person on the platform 18 faint or lose control of himself and fall or collapse in such a manner that the heel switch 43 is released.

Referring now to FIGURES 3, 4, and 5 details of the swivel structure 36 to which the ring 37 is secured will be described. Referring first to FIGURE 3 the swivel includes a body 44 having an upper tapered opening 45 and a lower tapered opening 46. These openings are designed to receive respectively conically shaped plugs 47 and 48 each having central bores passing therethrough. The conical plug 47 receives a vertical shaft 49 terminating within the body 44 in a laterally extending shaft 50. The shaft 50 connects to a potentiometer 51 from which the leads 38 extend for controlling left and right movement as described in conjunction with FIGURE 2.

A stationary bottom support 52 mounts a rigid vertically extending shaft 53 which passes through the central opening of the bottom conical plug 48 and terminates within the body 44 in a laterally extending shaft 54. The shaft 54 connects to a potentiometer 55 from which the leads 43 extend for controlling in and out movement as described in conjunction with FIGURE 2.

The conical plugs 47 and 48 are arranged to slide along the shafts 49 and 53 respectively. However, they are biased into the tapered openings 45 and 46 of the body 44 by compression springs 56 and 57 respectively.

Referring now to FIGURE 4, the manner in which the swivel control operates will be evident. Assume first that the ring 37 is engaged by the harvester's body to move to the left. This action will swing the shaft 49 to the left causing the same to tilt. This motion can only be accommodated by a sliding upward movement of the conical plug 47 which compresses the spring 56 slightly. The tendency of the spring 56 to bias the plug 47 into the tapered upper opening 45 results in an action which tends to center the shaft 49 with respect to the body 44 so that relaxation of the harvester's body pressure against the ring 37 in a leftward direction will result in the shaft 49 assuming an upright position. Still with reference to FIGURE 4, when the shaft 49 is tilted to the left as indicated, there will result a slight rotation of the lateral shaft 50 thereby moving the potentiometer 51 in one direction. If the shaft 49 is tilted to the right or in an opposite direction as indicated by the dotted lines, a similar action will take place to rotate the lateral shaft 50 and move the potentiometer in an opposite direction. It will thus be evident that the potentiometer 51 is caused to move to the left or right when the ring 37 is engaged by the harvester's body to tilt the shaft 49 to the left or right.

Referring to FIGURE 5, there is illustrated the operation of the swivel structure to effect inward and outward movement. As shown, when the harvester leans forwardly on the ring, he will tilt the shaft 49 in a forward direction. This action will result in the entire body 44 tilting with the shaft 49 because of the position of the shaft 50 in the body. As a result, the bottom conical plug 48 will tend to cam out of its tapered bottom opening to compress the spring 57. The action of the spring 57 tending to force the conical plug 48 into the bottom tapered opening tends to center the body 44 in the absence of any forward or rearward pressure thereon.

Tilting or rotational movement of the body 44 as illustrated in FIGURE 5 will rotate the shaft 54 to thereby actuate the potentiometer 55. If the body and shaft 49 are tilted in a rearward direction, to rotate the body 44 to the dotted line position illustrated in FIGURE 5, the potentiometer 55 will be moved in an opposite direction.

It will be evident from the foregoing that movement of the swivel structure in directions intermediate left and forward or right and rearward will result in a compound motion of the shaft 49 and the body 44 so that both potentiometers will be moved.

Operation of the potentiometers gives rise to signals for controlling the servo-valves which in turn control the hydraulic units all of which will be described subsequently.

Referring now to FIGURES 6, 7, and 8 there is shown an alternative type of swivel means which may be substituted for the swivel means described in FIGURES 3, 4, and 5. In the embodiment of FIGURES 6, 7, and 8, the swivel means is adapted for use by a seat in the event it is desired that the harvester or person on the platform frame be seated while performing manual operations such as picking fruit.

Thus, referring first to FIGURE 6 there is shown a modified platform frame 58 which may be connected to the same structure as the platform frame 18 of FIGURES 1 and 2. The structure 58 supports a seat 59 upon which is seated a harvester 60. The seat 59 includes a swivel structure 61 which is arranged to effect forward and rearward movement as indicated by the double headed arrow 62. Up and down movement is controlled by means of a pedal 63 serving the same function as the ring 40 of FIGURE 2 and as indicated by the double headed arrow 64.

In FIGURE 7, it will be noted that if the harvester leans to the left or right, movement may be effected as in the direction of the double headed arrow 65.

The manner in which the swivel structure 61 effects the foregoing movements will be evident by now referring to the enlarged view thereof as shown in FIGURE 8. As indicated, the structure includes lower and upper flanges 66 and 67 secured to the platform 58 and seat 59 respectively. These flanges are biased to a parallel relationship in spaced horizontal planes by a compression spring 68. The lower surface of the flange 67 is rigidly secured to a first yoke structure 69 having a potentiometer shaft 70 connecting to a first potentiometer 71. The upper surface of the flange 66 is similarly secured to a yoke 72 having a potentiometer shaft 73 connecting to a potentiometer 74.

If now the harvvester of FIGURE 6 should lean forwardly, the yoke 69 will rotate the potentiometer shaft 70 to operate the potentiometer 71. If the harvester leans rearwardly or backwardly, the potentiometer 71 will be operated in a reverse direction.

Similarly, if the harvester leans to the left or right, this motion will be imparted to the potentiometer shaft 73 through the yoke 69 and potentiometer shaft 70 to thereby operate the potentiometer 74. Suitable leads (not shown) from the potentiometers 71 and 74 connect respectively to the control units for effecting in and out and left and right movements.

The manner in which the potentiometer units described as well as other control features set forth function to operate the electrically controlled hydraulic servo-valves described in FIGURE 2 will now be evident by referring to FIGURE 9.

In FIGURE 9, the electrically controlled hydraulic servo-valves 25, 31, and 35 of FIGURE 2 have their coils schematically represented by resistances tapped to ground and are designated by like numerals. An unbalance of current in the resistances moves the valve, which may be a slide valve structure, in one direction or the other to add hydraulic fluid to one side or the other of a piston in the hydraulic cylinder-piston structures described in FIGURE 2 to effect the desired left-right, up-down, and in-out motions.

In the case of the left-right and in-out valve units 25 and 35, the balance or unbalance of currents in the resistances is controlled by the potentiometers 51 and 55 and their shafts 50 and 54 described in FIGURES 3 to 5, and these components are provided with like numerals in their schematic representation in FIGURE 9. The up and down control switch 42 of FIGURE 2 is represented by the two switches U and D for passing current through one or the other of the resistances representing the electrically controlled servo-valve 31.

Referring now to the left of FIGURE 9 there is shown a source of electrical energy such as a battery 75 having one side grounded as at 76 and the other side connecting to the heel switch 43 referred to in FIGURE 2. The heel switch or "dead man's switch" is normally biased to the dotted line position. When a harvester has his heel positioned on the switch, he holds it in the solid line position. In this position, power from the battery 75 is available on a power line 77. As shown, various adjustable resistances R1, R2, R3, and R4 branch from the power lead 77. The upper ends of the resistances terminate in the potentiometer taps 50 and 54 which are moved by the shafts 50 and 54 described in FIGURE 3, and in the up and down switches designated U and D. These resistances are set to control the rate of movement by controlling the magnitude of current to the valves.

The outside ends of the valve resistances 25 and 35 connect to the outside terminals of the potentiometer resistances 51 and 55 and the outside ends of the valve resistances 31 connect to the other sides of the up and down switches U and D.

Considering the operation of the circuit as described thus far, it will be evident that when no pressure is applied to the swivel control or the up and down control ring of FIGURE 2, the shafts corresponding to the wipers 50 and 54 will be centered as a consequence of the biasing springs as described in conjunction with FIGURES 3, 4 and 5. Also the up and down switches U and D are biased to an open position. If now, by way of example, the harvester or other person 19 in the platform frame 18 of FIGURE 2 wishes to raise the platform 18, he will engage the ring 40 with his knee to move the same upwardly. This action will close the upswitch U in FIGURE 9 so that current will flow from the battery 75 through the power lead 77 and through the variable resistance R2, the closed switch U and one of the resistances in the schematic representation of the electrical valve 31 to ground. This will result in the slide electrical valve operating to provide hydraulic fluid to the cylinder 29 in FIGURE 2 through the lower end so as to raise the carriage. When a desired height has been reached, the operator will release his knee pressure on the ring 40 so that the same will center and the switch U will open. The current to the resistance representing the electric slide valve 31 will cease so that the upper motion will cease.

If now the operator wishes to move in an outward direction, he will lean forwardly to engage the ring 37. This action will tilt the swivel shaft 49 as shown in FIGURE 5 in a direction to rotate the potentiometer 55. Thus as shown in FIGURE 9, when the potentiometer 55 is moved from its center position, the currents through the valve resistances 35 become unbalanced to operate the in and out cylinder 33 in a proper direction depending on the direction of movement of the wiper shaft 54.

Finally, if the operator wishes to move to the left or right, he will lean to the left or right to move the ring 37 in a similar direction thereby tilting the shaft 49 as described in FIGURE 4 and rotating the wiper shaft 50 for the potentiometer 51. When the wiper shaft 50 moves off from center position, the unbalance in the circuit will result in the hydraulic valve being moved in one direction or the other depending on whether the movement was to the left or right. When the operator releases the pressure on the ring, the various springs will tend to center the swivel structure so that the potentiometer wiper shafts will return to their center positions and the currents controlling the valves will be balanced so that the platform frame will remain in its moved position.

Still referring to FIGURE 9, the operation of the heel switch or "dead man's switch" 43 will be described. If the operator has moved the platform frame 18 to a desired position and is manually picking fruit or performing another operation and should he collapse or remove his heel from the heel switch, the arm on this switch will move to the dotted line illustrated in FIGURE 9. When this switch is moved to the dotted line position, power from the battery 75 is removed from the line 77 and applied to the line 78. Current will now pass down through a wiper tap 79 to a resistance 80. The tap 79 is connected to an arcuate shoe 81 which rotates with the boom and bears against a stationary portion of the apparatus indicated at 82. The structure 82 is coaxial with the boom 11 described in FIGURE 1. Should there be any tendency for drifting of the platform in a left or right direction, there will result a movement of the shoe 81 relative to the stationary vertical structure 82 but because of the frictional engagement of the shoe 81 with the structure 82, the result will simply be a movement of the wiper contact 79 relative to the resistance 80. There thus results an unbalanced condition to operate the electrically actuated valve 25 and, as in the case of movement of the potentiometer shaft 50, the direction of movement is such that the solenoid will immediately tend to actuate the rotary drive unit to move the platform in a reverse direction from its drifting direction until the tap 79 is centered.

As a result, the foregoing structure will "lock" the platform frame insofar as rotation is concerned in its set or latest position.

A similar control is provided by a tap 83, passing to a resistance 84 and actuated by a shoe 85 carried on the carriage and bearing against a stationary vertical portion 86. The portion 86 constitutes part of the stationary frame of the apparatus. With this arrangement, any tendency after the heel switch 43 is in its dotted line position for the frame platform to drift upwardly or downwardly as a consequence of slight electrical unbalance, will result in a movement of the shoe 85 with respect to the stationary structure 86 to move the wiper contact 83 with respect to the resistance 84. Movement of the tap 83 with respect to the resistance 84 will result in a current flow through the electrically actuated valve structure 31 to operate the carriage in an up or down direction opposite to the drift direction until the same is in its last placed position. Thus up and down motion of the carriage is locked by the structure described.

Finally, in and out motion of the frame platform is locked by a wiper arm 87 operating on a resistance 88 and connected to a shoe 89 carried on the lazy tong structure and bearing against a horizontal stationary structure 90. As in the case of vertical movement if there is any inward or outward drifting movement, the resulting movement of the shoe 89 from its last position against the stationary structure 90 will result in movement of the wiper contact 87 against resistance 88 to unbalance the circuit current to the electrically actuated hydraulic valve 35 for in and out movement with the result that the valve will be operated to move the platform frame in an in or out direction opposite to the direction of drift until the same is centered in its last set position.

When the operator recovers or is replaced by a new man, depression of the heel switch will open the circuits to the shoes and again place control of the apparatus with the operator so that the desired motions can be effected by the rings as described.

From the foregoing description, it will be evident that a very simple and reliable tree crop harvesting apparatus has been provided. While only certain structures and circuits have been illustrated as constituting a preferred embodiment of the invention, it will be evident to those skilled in the art that other equivalent means for performing the various motions desired can be effected within the scope and spirit of this invention. The basic concept of providing a system wherein power movement is automatically responsive to body movements in the desired direction is not to be thought of as limited to the one particular structure set forth merely for illustrative purposes.

What is claimed is:

1. A tree crop harvesting apparatus comprising in combination: a supporting structure adapted to be positioned adjacent to trees; a vertical boom mounted on said structure for rotation about a vertical axis; a carriage mounted on said boom for up and down traveling movement therealong; a platform frame for carrying a person mounted to said carriage for in and out traveling movement in a horizontal direction; first, second, and third drive means connected respectively to rotate said vertical boom, move said carriage, and move said platform frame; and first, second, and third control means in said platform frame for operation by a harvester carried by said platform frame and respectively connected to said first, second, and third drive means for enabling selective, independent operation thereof, said first and third control means including swivel means having at least a portion of a ring disposed generally in a horizontal plane in a position to surround the chest of said harvester so that said portion is engaged by the chest of said harvester upon right and left movement of said harvester to operate said first drive means to rotate said boom in a direction to move said platform to the right and left respectively; and so that said portion of said ring is engaged by the chest of said harvester upon back and forth movement of said harvester to operate said third drive means to move said platform frame in and out respectively, whereby said platform frame will move in the direction in which said harvester leans.

2. A tree crop harvesting apparatus comprising in combination: a supporting structure adapted to be positioned adjacent to trees; a vertical boom mounted on said structure for rotation about a vertical axis; a carriage mounted on said boom for up and down traveling movement therealong; a platform frame for carrying a person mounted to said carriage for in and out traveling movement in a horizontal direction; first, second, and third drive means connected respectively to rotate said vertical boom, move said carriage, and move said platform frame; and first, second, and third control means in said platform frame for operation by a harvester carried by said platform frame and respectively connected to said first, second, and third drive means for enabling selective, independent operation thereof, said first and third control means including swivel means having a seat for said harvester, leaning of said harvester while seated to the right and left and rearwardly and forwardly causing said first and third control means to operate said first and third drive means respectively, whereby said platform frame will move in the direction in which said harvester leans while seated.

3. An apparatus for moving a person comprising, in combination: a supporting structure; a vertical boom mounted on said structure for rotation about a vertical axis; a carriage mounted on said boom for up and down traveling movement therealong; a platform frame for carrying a person mounted to said carriage for in and out traveling movement in a horizontal direction; first, second, and third drive means connected respectively to rotate said vertical boom, move said carriage, and move said platform frame; and first, second, and third control means in said platform frame for operation by a person carried by said platform frame and respectively connected to said first, second, and third drive means for enabling selective, independent operation thereof, said first and third control means including a torso engaging means free of the arms and legs of said person positioned to be moved by the torso of said person upon right and left movement of said person to operate said first drive means to rotate said boom in a direction to move said platform to the right and left respectively and to be moved by the torso of said person upon back and forth movement of said person to operate said third drive means to move said platform frame in and out respectively, whereby said platform frame will move in the direction in which said person leans.

4. An apparatus according to claim 3, in which said second control means includes means responsive to the movement of at least a portion of the leg of said person in an up and down direction for operating said second drive means.

5. An apparatus according to claim 3, including switch means biased to a position to cause said first, second, and third drive means to hold said platform frame in any selected position to which it is moved, holding of said switch means in another position by said person releasing said drive means so that the same may be operated by said control means.

References Cited

UNITED STATES PATENTS

| | | | |
|---|---|---|---|
| 2,841,659 | 7/1958 | Eitel | 182—2 |
| 3,095,061 | 6/1963 | Gregory | 182—2 |
| 3,236,329 | 2/1966 | Price | 182—14 |

FOREIGN PATENTS

| | | |
|---|---|---|
| 1,020,454 | 12/1957 | Germany. |

REINALDO P. MACHADO, *Primary Examiner.*